United States Patent
Colclasure

(10) Patent No.: US 7,610,861 B1
(45) Date of Patent: Nov. 3, 2009

(54) MAGNETIC AND INERTIAL PROPULSION SYSTEM

(76) Inventor: William J. Colclasure, 5421 Baybrook Ave., Orlando, FL (US) 32819

( * ) Notice: Subject to any disclaimer, the term of this patent is extended or adjusted under 35 U.S.C. 154(b) by 128 days.

(21) Appl. No.: 11/557,228

(22) Filed: Nov. 7, 2006

Related U.S. Application Data

(60) Provisional application No. 60/734,638, filed on Nov. 7, 2005.

(51) Int. Cl.
*B60L 13/00* (2006.01)
*A63H 33/26* (2006.01)

(52) U.S. Cl. .......... 104/292; 104/290; 446/129

(58) Field of Classification Search ........ 104/290, 104/292, DIG. 1; 446/129, 168, 173, 174, 446/444, 445
See application file for complete search history.

(56) References Cited

U.S. PATENT DOCUMENTS

| | | | |
|---|---|---|---|
| 3,664,268 A | 5/1972 | Lucas et al. | |
| 3,884,154 A * | 5/1975 | Marten | 104/286 |
| 3,899,979 A | 8/1975 | Godsey, Jr. | |
| 4,075,948 A | 2/1978 | Minovitch | |
| 4,148,260 A | 4/1979 | Minovitch | |
| 4,197,933 A * | 4/1980 | Dunstan et al. | 198/334 |
| 4,215,330 A * | 7/1980 | Hartman | 335/306 |
| 4,709,639 A * | 12/1987 | Geais | 104/292 |
| 5,148,753 A * | 9/1992 | Lapp et al. | 104/290 |
| 5,263,419 A * | 11/1993 | Moroto et al. | 104/290 |
| 5,375,531 A | 12/1994 | Ogihara et al. | |
| 5,402,021 A * | 3/1995 | Johnson | 310/12.24 |
| 5,513,573 A | 5/1996 | Sutton | |
| 5,628,252 A | 5/1997 | Kuznetsov | |
| 5,653,175 A | 8/1997 | Milligan | |
| 6,237,499 B1 * | 5/2001 | McKoy | 104/59 |
| 6,252,316 B1 * | 6/2001 | Fujie | 310/12 |
| 6,482,070 B2 * | 11/2002 | Hogan | 446/462 |
| 6,758,146 B2 | 7/2004 | Post | |
| 6,875,115 B2 | 4/2005 | Fea | |
| 7,040,481 B1 * | 5/2006 | Sommerhalter et al. | 198/619 |
| 2004/0239461 A1 * | 12/2004 | Kincaid et al. | 335/207 |
| 2005/0061195 A1 * | 3/2005 | Lutz et al. | 104/290 |
| 2006/0042497 A1 * | 3/2006 | Yamada | 104/18 |
| 2008/0146115 A1 * | 6/2008 | Yamana | 446/129 |
| 2009/0078484 A1 * | 3/2009 | Kocijan | 180/167 |

* cited by examiner

*Primary Examiner*—S. Joseph Morano
*Assistant Examiner*—Jason C Smith
(74) *Attorney, Agent, or Firm*—Allen Dyer Doppelt Milbrath & Gilchrist

(57) ABSTRACT

A propulsion system that uses an alternating series of magnetic forces, inertia, and gravitational drops to propel a magnetic object along a pathway. The pathway can be an undulating track that can retain an object thereon. A plurality of magnet pairs are placed along the track, one of each pair on either side of the track, the pairs in spaced relation from each other along the track. The magnet pairs are positioned and aligned so as to propel the object up each up-slope to a crest, at which point the object falls through gravity down the down-slope and gains inertia. The track can be configured linearly or in a circle, for example, depending upon the desired orientation. In an alternate embodiment, a magnet can be positioned atop the track to attract the object up the slope.

15 Claims, 5 Drawing Sheets

MAGNETIC AND INERTIAL PROPULSION SYSTEM

CROSS-REFERENCE TO RELATED APPLICATION

This application claims priority to provisional application Ser. No. 60/734,638, filed Nov. 7, 2005, entitled "Magnetic and Inertial Propulsion System."

FIELD OF THE INVENTION

This invention relates to propulsion system, and, more particularly, to propulsion systems driven by a combination of magnetism and inertia.

BACKGROUND OF THE INVENTION

Propulsion systems are known in the art that use arrangements of permanent magnets aligned in staggered relation along a pair of tracks.

SUMMARY OF THE INVENTION

The present invention is directed to a propulsion system that uses an alternating series of magnetic forces, inertia, and gravitational drops to propel a magnetic object along a pathway. The pathway comprises an undulating track having means for retaining an object thereon. In one embodiment, a plurality of magnet pairs are placed along the track, one of each pair on either side of the track, the pairs in spaced relation from each other along the track.

The magnet pairs are positioned and aligned so as to propel the object up each up-slope to a crest, at which point the object falls through gravity down the down-slope and gains inertia.

The track can be configured linearly or in a circle, depending upon the desired orientation.

In other embodiments the propelling magnets can be placed above the track, and additional magnets can be provided to repel the object from re-ascending a down-slope. Further magnets can also be provided in some embodiments beneath the track for assisting in "lifting" the object along its pathway.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Preferred embodiments of the present invention will now be discussed with reference to FIGS. 1-8.

Figure 1:
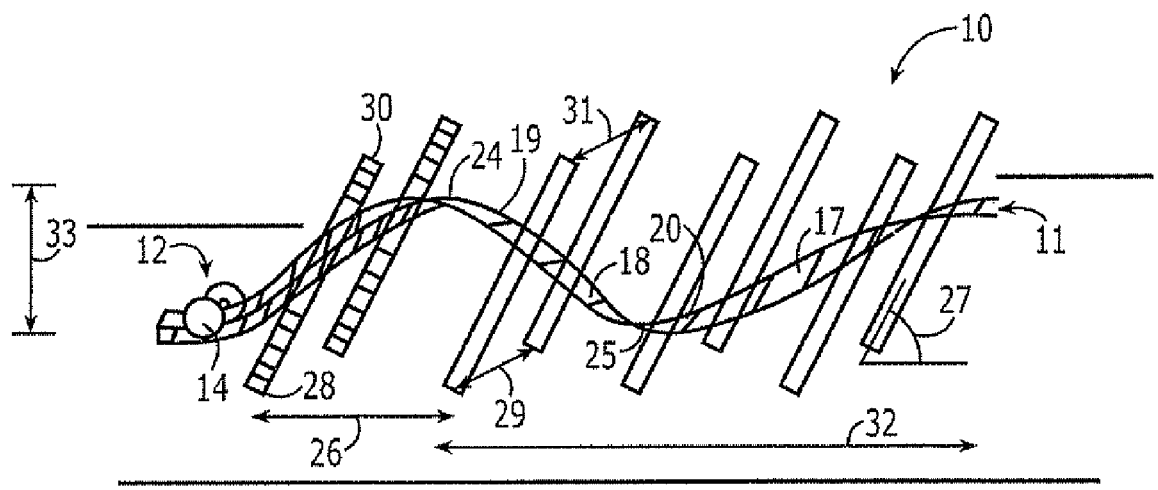
FIG. 1 is a side view of the device of the present invention.
Figure 2:
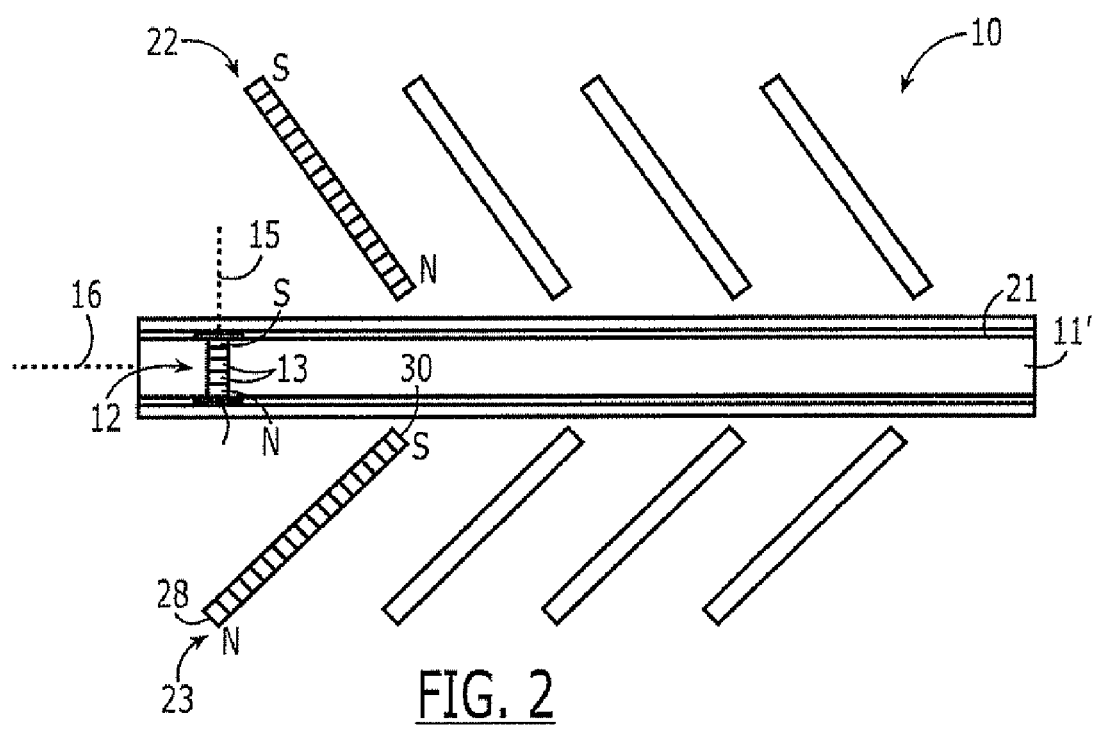
FIG. 2 is a top plan view of the device of FIG. 1, with an alternate form of track.
Figure 3:
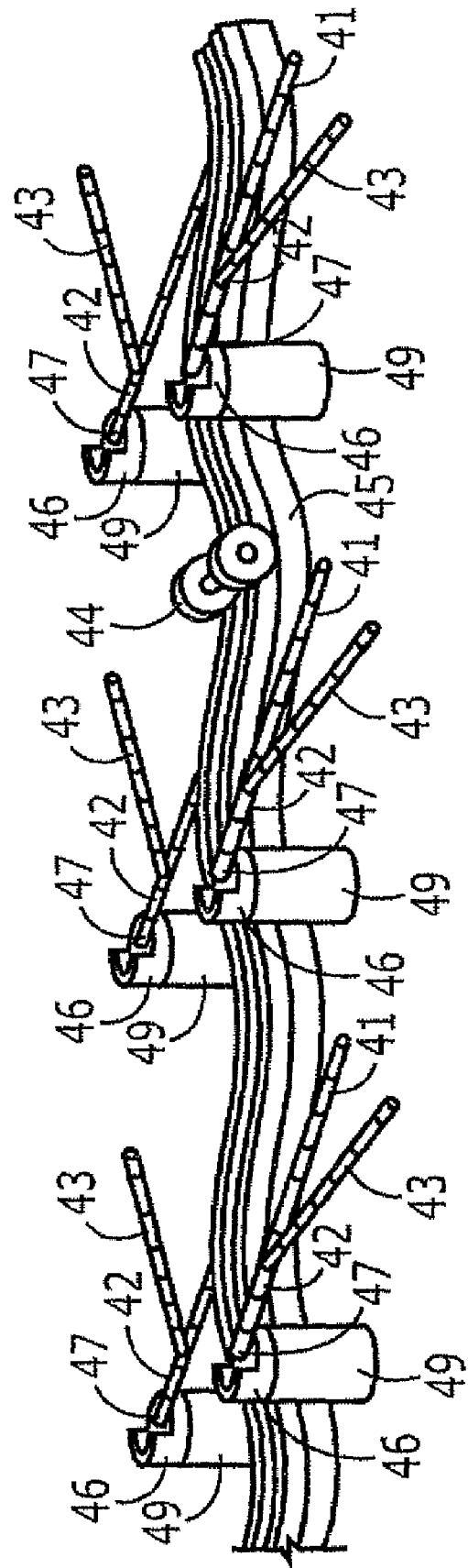
FIG. 3 is a side perspective view of a second embodiment of the device.
Figure 4:
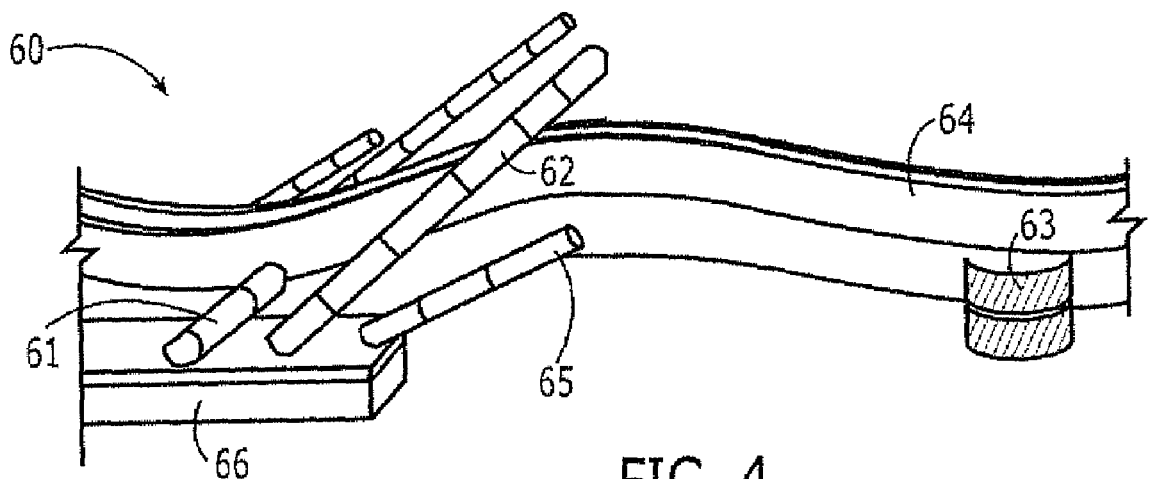
FIG. 4 is a side perspective view of a third embodiment of the device.
Figure 5:
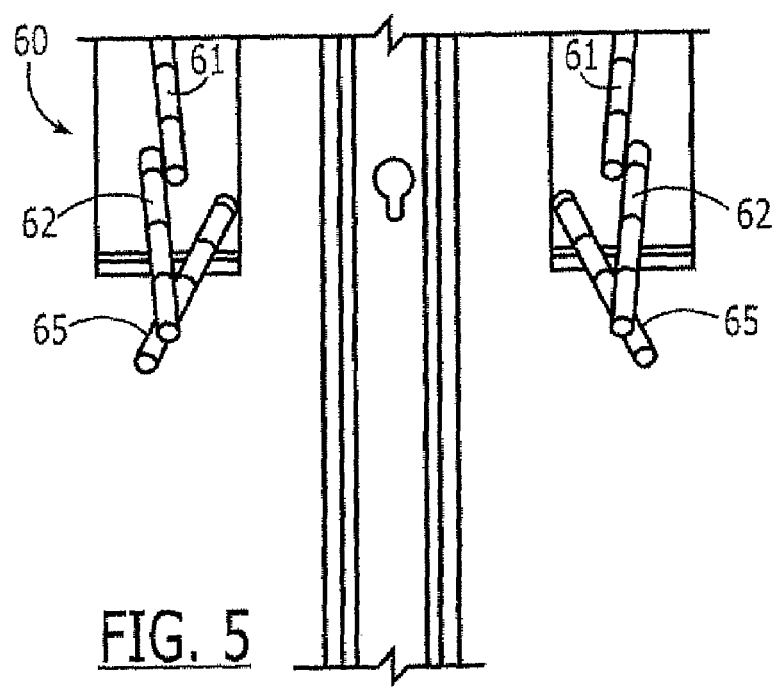
FIG. 5 is a top perspective view of the third embodiment of FIG. 4.
Figure 6:
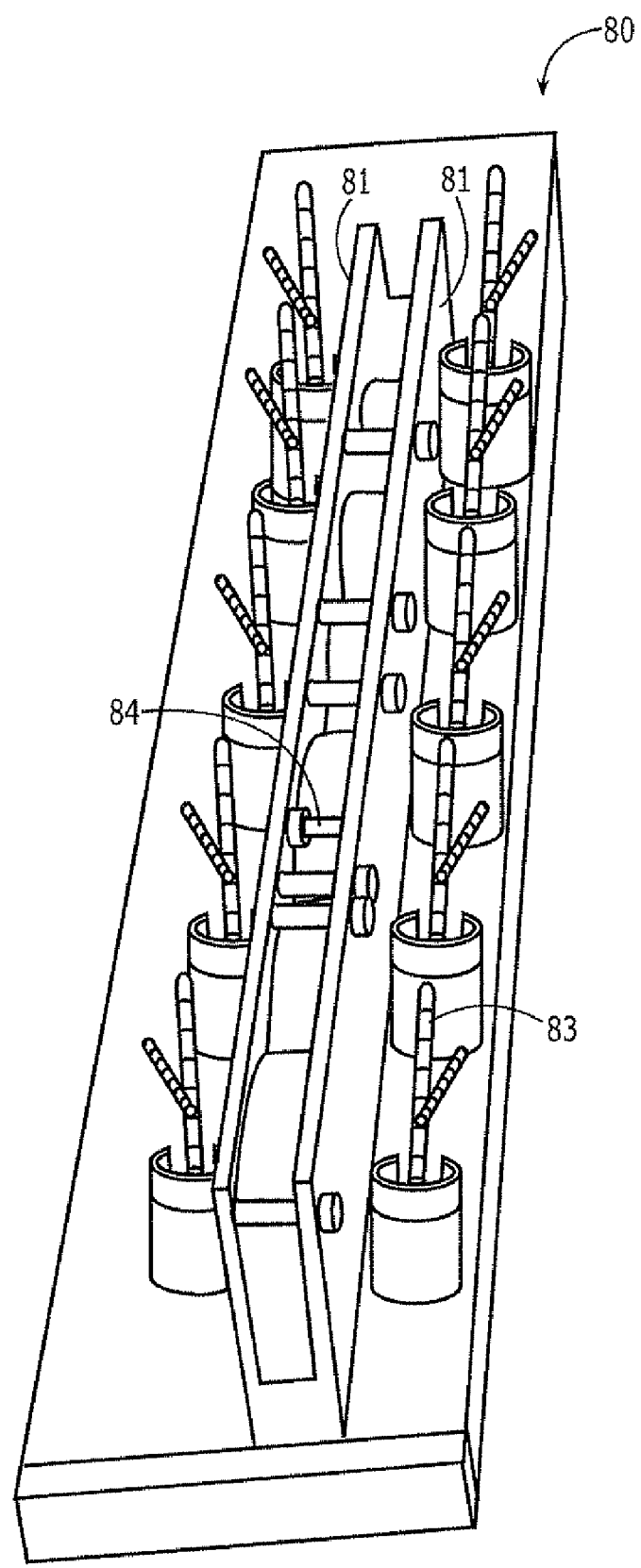
FIG. 6 is a top perspective view of a fourth embodiment of the device.
Figure 7:
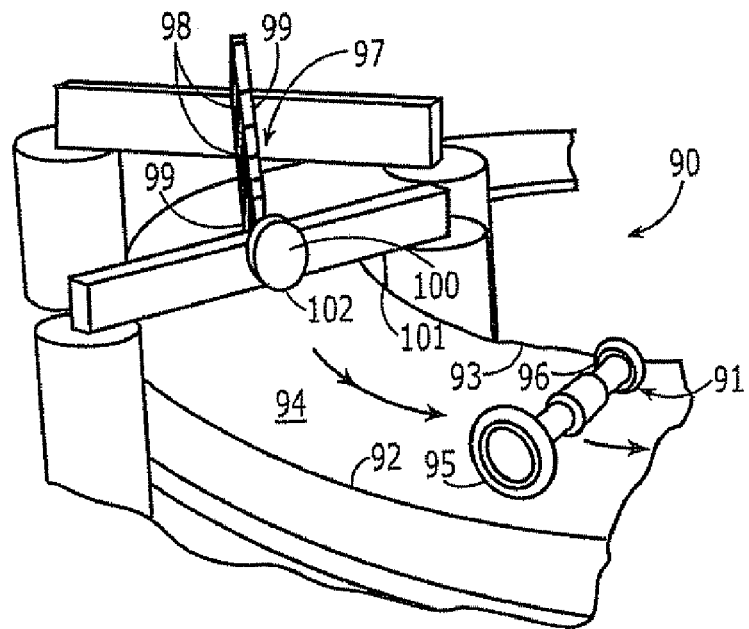
FIG. 7 is a top perspective view of a fifth embodiment of the device.
Figure 8:
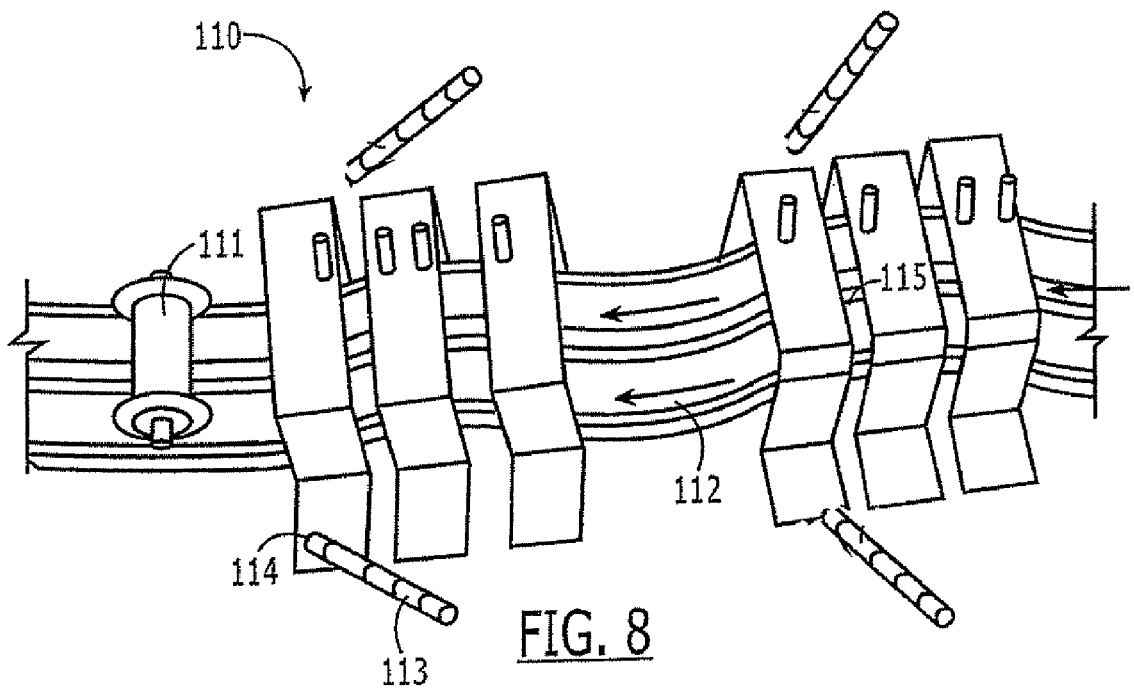
FIG. 8 is a top perspective view of a sixth embodiment of the device.

The present invention is directed to a propulsion system for moving an object along an undulating track. In a first embodiment of the system 10 for moving an object along a track 11 (FIGS. 1 and 2). The object in an exemplary embodiment comprises a wheeled axle 12 that includes four magnets 13 positioned so as to form a cylinder and two steel washers 14 in coaxial and surrounding relation thereto, the washers 14 having a diameter greater than that of the magnets 13.

The axis 15 of the magnet stack 13 and washers 14 is orientable approximately perpendicular to a long axis 16 of the track 11, so that a south pole S is facing in one direction and a north pole N in the opposite direction. One of skill in the art will recognize that this construction is not intended to be limiting, and that the invention is intended to contemplate any device comprising a magnet in a configuration wherein the poles are oriented substantially perpendicular to the track 11.

The track 11 in a preferred embodiment comprises a series of up-17 and down-18 slopes. The track 11 may have any top plan configuration, such as, but not intended to be limited to, straight or circular. The up-17 and down-18 slopes may comprise smooth undulations or may comprise a sawtooth-type configuration.

Preferably the track 11 further has means for retaining the axle 12 thereon. For example, the track 11 may comprise a railroad-type track with rails 19 and cross-beams 20, wherein the axle's outer elements, here, the washers 14, can ride outside respective rails 19 and thereby be retained on the track 11. This configuration may also be constructed without cross-beams. Alternatively, the track 11' can comprise an element having grooves 21 dimensioned for permitting the washers 14 to ride therein. Again, these track 11,11' configurations are not intended to be limiting.

A plurality of magnet pairs 22,23 are placed along the track 11, positioned so that their respective magnetic fields can interact with those of the axle's magnet 13. In a particular embodiment, the magnet pairs 22,23 can comprise a substantially cylindrical stack of magnets, although this is not intended as a limitation. The pairs 22,23 are oriented so that, along each side, a common polarity is oriented upward and toward the track 11, with the opposite polarity on the opposite side of the track 11. The pairs 22,23 are positioned in spaced relation from each other along the track 11, and are generally opposite each other across the track 11.

The axle 12 is positioned on the track 11 so that its magnet stack 13 is oriented opposite to that of the magnet pairs 22,23. In the exemplary embodiment of FIG. 2, for example, the magnet stack 22 on the top of the figure has a north pole N pointing toward the track, and the magnet stack 23, the south pole S. The axle 12 has its magnet stack 13 oriented with the south pole S upward on the figure.

It will be understood by one of skill in the art that different pole orientations may be used to achieve substantially the same effect, and that those described above are not intended to be limiting. Further, the axle's magnets 13 can even be configured to have like poles pointing outward by forcibly retaining them together, in which case the magnet pairs 22,23 can have like orientations opposite to that at the ends of the axle magnets 13.

The magnet stack pairs 22,23 are positioned and aligned so as to propel the axle 12 up each up-slope 17 to a peak 24, at which point the axle 12 falls through gravity down the down-slope 18 and gains inertia. So long as the elements of the device 10 are carefully positioned, an axle 12 can be positioned to begin at the valley 25 of an undulation, and move along the track 11 under alternating influence of magnetic fields and gravity.

In a particular embodiment that has been tested by the inventor, the magnets 13,22,23 comprise rare earth magnets of 0.2 in. height and ⅜ in. diameter. The entire axle 12 weighs approximately 2 oz, and comprises four magnets 13 and two washers 14.

The magnet stacks 22,23 are approximately 3.6 in. long, with a longitudinal separation 26 of approximately 3 in., and form an angle 27 of approximately 45° with the horizontal. The bottoms 28 of the stacks 22,23 are approximately 6 in. apart 29 across the track; the tips 30, 4 in. apart 31; so they lean inward toward the track at the top. The polarities shown can be reversed without affecting the invention.

The period 32 of the track 11 is approximately 8.5 in., with an amplitude 33 of 1.5 in. The axle 12 has been shown to achieve a speed of 1 ft/sec.

In a second embodiment (FIG. 3), the system 40 comprises rare earth magnets 41 that are 0.25 in. in diameter. The magnet stacks 42 in this embodiment are approximately 7 in. long. In addition to these primary magnet stacks 42 are included secondary magnet stacks 43 that are approximately 4 in. long, and are set at an angle to the primary magnet stacks 42 so as to point to a medial "dead zone" of magnetic field. The secondary stacks 43 serve to assist in lifting the axle 44 fully up the ascent of the undulating track 45.

The second system 40 additionally comprises a "field modifier" 46 positioned adjacent the tops 47 of the primary magnet stacks 42. The field modifiers 46 can be made of ferrite or mu metal, and have an arcuate shape, with the inward portion of the arch facing the primary magnet stack top 47. The field modifiers 46 are believed to redirect post-peak fields after the track hump 48 away from the track 45, permitting an improved roll-away of the axle 44 down the track 45. In a particular embodiment, the field modifiers 46 are provided in duplicate, with the arches nested. The field modifiers 46 can be supported above the track 45, for example, with the use of a column 49 of clay, although this is not intended as a limitation.

A third embodiment of the system 60 (FIGS. 4 and 5) is similar to the second embodiment 40. This system 60 further comprises a set of tertiary magnet stacks 61, which are positioned nearly parallel to the primary stacks 62, and augment the fields provided thereby. Further, in this embodiment 60 the two field modifiers 63 are stacked and positioned along the track 64, with the arches pointing toward the track 64. Also provided herein are transverse magnets 65, which are embedded in clay supports 66 positioned beneath the track 64.

Particular measurements (all in in.) are provided for this system 60, which are intended as exemplary only and not to be limiting:

| | | | |
|---|---|---|---|
| primary stack length | 5.25 | secondary stack length | 2.75 |
| tertiary stack length | 3.0 | tip-to-tip distance between primary stacks | 5.0 |
| tip-to-tip distance between secondary stacks | 6.0 | tip-to-tip distance between tertiary stacks | 6.0 |
| base-to-base distance between primary stacks | 7.5 | base-to-base distance between secondary stacks | 4.5 |
| base-to-base distance between tertiary stacks | 8.5 | height of tip of primary stacks | 2.75 |
| height of tip of secondary stacks | 1.38 | height of tip of tertiary stacks | 1.12 |
| track height at peak | 1.75 | track height at well | 1.0 |
| track period | 8.19 | track peak-to-peak distance (linear travel along track) | 8.5 |

The bases of the primary, secondary, and tertiary stacks are at 0 in. from the surface.

A fourth embodiment 80 (FIG. 6) includes a track that comprises a pair of wooden sheets 81 supported on end to form retaining walls inside which the axle 82 can travel. Here a net height increase can be achieved, in an exemplary embodiment, of 5 in., using the magnet stacks 83 illustrated.

A fifth embodiment 90 (FIG. 7) includes an axle 91 in which the magnetic component has a first polarity adjacent a first 92 and a second 93 side of the track 94. In this case the track 94 comprises a circular foam material, although this is not intended as a limitation. The axle 91 has wheels 95,96 that have different diameters dimensioned so that the axle 91 will turn naturally into the curve of the track 94. Preferably the axle 91 also has a length sufficient to permit the use of an overhead magnet set 97, which has a polarity adapted for attracting the center of the axle 91, that is, the second polarity opposite the first polarity. Here the magnet set 97 a plurality, here seven, stacks 98 of magnets that are positioned vertically on a support comprising two opposed surfaces 99. They are positioned in spaced-apart relation along the long axis of the track 94, with the spacing decreasing from an upstream end to a downstream end of the set 97.

This embodiment 90 further comprises a secondary magnet 100 affixed to the support 99 above the track's crest 101. The secondary magnet 100 has an end 102 facing the track crest 101 of the second polarity for repelling the axle 91 down the down-slope of the track 94 and thereby preventing the axle 91 from returning toward the secondary magnet 100.

In yet another embodiment 110 (FIG. 8) an axle 111 such as used in the preceding embodiment 90 is employed on an undulating track 112. Here side-pushing magnet stacks 113 are added to the configuration of FIG. 7, with the tips 114 positioned just past the crest 115 of each undulation on each side, substantially parallel with the axis of the axle 111.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

What is claimed is:

1. A propulsion system comprising:
   an undulating track having a plurality of peaks and valleys with up- and down-slopes therebetween and extending between a beginning point and an end point;
   an axle configured to travel along a long axis of the track and having a magnetic component oriented perpendicular to the track long axis, the magnetic component having a first polarity adjacent a first side of the track and a second polarity opposite the first polarity adjacent a second side of the track opposed to the first side; and
   a plurality magnets affixed in opposed pairs on either side of the track, a top end of each magnet oriented adjacent and on an up-slope side of each crest, each magnet top adjacent the track first side having the second polarity, and each magnet top adjacent the track second side having the first polarity;

wherein the axle is pulled along the track up-slope by the magnet pairs to the track peaks, and falls along the track down-slope under the influence of gravity.

2. The propulsion system recited in claim 1, wherein the axle comprises a cylindrical array of cylindrical magnets oriented in a stacked configuration with unlike poles facing, and two cylindrical wheel elements affixed at either end of the cylindrical array, and the track comprises a top surface having grooves therein along the long axis dimensioned to permit the wheel elements to ride therein.

3. The propulsion system recited in claim 1, wherein the axle comprises a cylindrical array of cylindrical magnets oriented in a stacked configuration with unlike poles facing, and two cylindrical wheel elements affixed at either end of the cylindrical array, and the track comprises a top surface having a pair of upwardly extending tracks therealong along the long axis dimensioned to permit the wheel elements to straddle the tracks.

4. The propulsion system recited in claim 1, wherein the track is one of substantially linear and substantially circular.

5. The propulsion system recited in claim 1, further comprising a field modifier positioned adjacent each magnet top for decreasing an influence of a magnetic field of each magnet in a downstream direction.

6. The propulsion system recited in claim 5, wherein the field modifier comprises an arcuate element having an inner arc facing the respective magnet top.

7. The propulsion system recited in claim 6, wherein the arcuate element comprises one of a ferrite material and a mu-metal.

8. The propulsion system recited in claim 1, wherein the magnets each comprise a substantially cylindrical stack of substantially cylindrical magnets having unlike poles facing, each stack having a long axis positioned pointing downstream and at an angle to the long axis of the track between 0 and 60 degrees, and further at an angle to the horizontal between 30 and 60 degrees.

9. The propulsion system recited in claim 8, wherein the cylindrical magnet stack comprises a primary cylindrical magnet stack, and further comprising a secondary substantially cylindrical stack of substantially cylindrical magnets having unlike poles facing, each secondary stack having a long axis positioned pointing downstream and substantially parallel to the primary stack, having a bottom end positioned upstream of a bottom end of the primary stack, and having a length less than a length of the primary stack.

10. The propulsion system recited in claim 8, wherein the cylindrical magnet stack comprises a primary cylindrical magnet stack, and further comprising a tertiary substantially cylindrical stack of substantially cylindrical magnets having unlike poles facing, each tertiary stack having a long axis positioned pointing downstream at an angle to the track long axis greater than the angle of the primary stack to the track long axis, having a bottom end positioned downstream of a bottom end of the primary stack and farther from the track than that of the primary stack, and having a length less than a length of the primary stack.

11. The propulsion system recited in claim 1, further comprising a transverse magnet positioned beneath the track downstream of and adjacent each valley, the transverse magnet having a directionality substantially opposite that of the axle.

12. A propulsion system comprising:
an undulating track having a plurality of peaks and valleys with up- and down-slopes therebetween;
an axle configured to travel along a long axis of the track and having a magnetic component oriented perpendicular to the track long axis, the magnetic component having a first polarity adjacent a first and a second side of the track opposed to the first side and a second polarity in a center of the axle opposite the first polarity; and
a plurality magnets affixed above the track, a top end of each magnet oriented adjacent and on an up-slope side of each crest, each magnet top having a polarity and positioned to attract the axle;
wherein the axle is pulled along the track up-slope by the magnets to the track peaks, and falls along the track down-slope under the influence of gravity.

13. The propulsion system recited in claim 12, further comprising a support positioned above the track, and wherein the magnets are affixed to the support above a center of the track, the magnets having the first polarity facing the track.

14. The propulsion system recited in claim 13, wherein each of the magnets comprises a set of spaced-apart magnets affixed to the support and along the track and upstream of each track crest, the set of magnets having a spacing therebetween that decreases from an upstream end of the set to a downstream end of the set.

15. The propulsion system recited in claim 13, further comprising a secondary magnet affixed to the support above the track crest, the secondary magnet having an end facing the track crest of the second polarity for repelling the axle down the down-slope of the track.

\* \* \* \* \*